(12) United States Patent
Kim et al.

(10) Patent No.: US 10,086,702 B2
(45) Date of Patent: Oct. 2, 2018

(54) DASHBOARD DISPLAY INDICATING SPEED AND VEHICLE HAVING THE SAME

(71) Applicant: LG ELECTRONICS INC., Seoul (KR)

(72) Inventors: Sangwon Kim, Seoul (KR); Kyunglack Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/479,319

(22) Filed: Apr. 5, 2017

(65) Prior Publication Data

US 2018/0079306 A1 Mar. 22, 2018

(30) Foreign Application Priority Data

Sep. 21, 2016 (KR) .......................... 10-2016-0120893

(51) Int. Cl.
*B60Q 1/00* (2006.01)
*B60K 37/02* (2006.01)
(52) U.S. Cl.
CPC .................................... *B60K 37/02* (2013.01)
(58) Field of Classification Search
CPC ................................. B60K 37/02; B60Q 1/00
USPC .......................... 340/441, 438, 461, 514, 525
See application file for complete search history.

(56) References Cited

U.S. PATENT DOCUMENTS

| 6,812,942 | B2* | 11/2004 | Ribak | B60K 35/00 |
| | | | | 345/30 |
| 8,483,907 | B2* | 7/2013 | Tarte | B60K 35/00 |
| | | | | 345/77 |
| 2014/0111540 | A1* | 4/2014 | Morimoto | B60K 35/00 |
| | | | | 345/619 |
| 2015/0153936 | A1* | 6/2015 | Lim | G06F 3/017 |
| | | | | 715/716 |
| 2017/0154605 | A1* | 6/2017 | Kajita | G09G 5/10 |

FOREIGN PATENT DOCUMENTS

| JP | 2004182092 | 7/2004 |
| JP | 2007153116 | 6/2007 |
| JP | 2008-195393 | 8/2008 |
| JP | 2009-179240 | 8/2009 |
| JP | 2011251681 | 12/2011 |
| JP | 2014202516 | 10/2014 |
| JP | 2015-223877 | 12/2015 |
| JP | 2016038237 | 3/2016 |
| KR | 20-1998-0009254 | 4/1998 |
| KR | 10-2012-0020745 | 3/2012 |
| KR | 10-1555790 | 9/2015 |

* cited by examiner

*Primary Examiner* — Tai T Nguyen
(74) *Attorney, Agent, or Firm* — Fish & Richardson P.C.

(57) ABSTRACT

A dashboard display of a vehicle includes a display panel having a speed display area that outputs a speed range of the vehicle at a first speed interval and an event display area that outputs an event information, a needle for indicating a current speed of the vehicle by rotating to thereby point to a corresponding position along the displayed speed range, and a controller that is configured to, when one or more preset conditions of the vehicle being satisfied, change a boundary of the speed display area from a first speed display area within the display panel to a second speed display area within the display panel that is different from the first speed display area.

20 Claims, 15 Drawing Sheets

⬇ ACCELERATING FROM 60 KM/H → 90 KM/H

⇩ ACCELERATING FROM 40 KM/H → 80 KM/H

DASHBOARD DISPLAY INDICATING SPEED AND VEHICLE HAVING THE SAME

CROSS-REFERENCE TO RELATED APPLICATION

Pursuant to 35 U.S.C. § 119(a), this application claims the benefit of an earlier filing date of and the right of priority to Korean Application No. 10-2016-0120893, filed on Sep. 21, 2016, the contents of which are incorporated by reference herein in its entirety.

TECHNICAL FIELD

This application relates to a dashboard display for providing a driving state of a vehicle and operation information regarding various equipped devices to a driver, and a vehicle having the same.

BACKGROUND

A vehicle is an apparatus capable of carrying or moving people or loads using kinetic energy, and a representative example may be a car.

For safety and convenience of a user of the vehicle, various sensors and devices may be equipped in the vehicle to further enhance the functionality of the vehicle. The functions of the vehicle may be divided into a convenience function that can improve a driver's convenience and a safety function for enhancing safety of the driver and/or pedestrians.

Convenience functions can include infotainment (information+entertainment) to the vehicle, supporting a partially autonomous driving function, or helping the driver ensuring a field of vision at night or at a blind spot. For example, the convenience functions may include an active cruise control (ACC), a smart parking assist system (SPAS), a night vision (NV), a head up display (HUD), an around view monitor (AVM), an adaptive headlight system (AHS), and the like. Safety functions can help improve the safety of the driver and/or pedestrians, and may include various functions such as a lane departure warning system (LDWS), a lane keeping assist system (LKAS), an autonomous emergency braking (AEB), and the like. Various types of displays may be disposed within the vehicle to support such convenience and safety functions.

SUMMARY

According to one aspect, a dashboard display of a vehicle includes a display panel having a speed display area that outputs a speed range of the vehicle at a first speed interval and an event display area that outputs an event information, a needle that is configured to indicate a current speed of the vehicle by rotating to thereby point to a corresponding position along the displayed speed range, and a controller that is configured to, based on one or more preset conditions of the vehicle being satisfied, change a boundary of the speed display area from a first speed display area within the display panel to a second speed display area within the display panel that is different from the first speed display area.

Implementations according to this aspect may include one or more of the following features. For example, the controller may be configured to, based on the one or more preset conditions of the vehicle being satisfied, change the event display area from a first event display area within the display panel to a second event display area within the display panel that is different from the first event display area. In some cases, one or more of display size, display position, or display shape of the first speed display area is different from the corresponding ones of the second speed display. The first speed display area may output a first speed range of the vehicle, and the second speed display area may output a second speed range of the vehicle, the first speed range and the second speed range having a different maximum displayed speed range or a different speed interval or both. The one or more preset conditions may include a rotation angle of the needle or a change in a size of the event display area or both.

In some implementations, the controller may be configured to, based on a rotation angle of the needle being within a first range, set the speed display area to be the first speed display area and the event display area to be the first event display area, and the controller may be configured to, based on the rotation angle of the needle being within a second range that is different from the first range, set the speed display area to be the second speed display area and the event display are to be the second event display area. In some cases, the display may include the speed display area, the event display area, and a revolution per minute (RPM) display area that outputs an RPM range of an engine of the vehicle. The dashboard display may further include an RPM needle that is configured to indicate a current RPM of the vehicle's engine by rotating to thereby point to a corresponding position along the displayed RPM range. In addition, the controller may be configured to, based on the one or more preset conditions of the vehicle being satisfied, change a boundary of at least one of the speed display area, the event display area, or the RPM display area. The event display area may be positioned horizontally between the speed display area and the RPM display area, and wherein the needle of the speed display area and the RPM needle of the RPM display area are configured to point outward away from the event display area when in their respective home positions and to rotate inward toward the event display area to indicate the current speed and the current RPM, respectively.

In some cases, the controller may be configured to provide to be displayed on the speed display area a virtual needle that points to a speed other than the current speed. The controller may be configured to provide to be displayed on the speed display area, adjacent to a moving end of the needle, a numerical value of the current speed that moves along with the moving end of the needle. In addition, the needle may be a first needle, the dashboard display may include a second needle, the controller may be configured to provide to be displayed a first gauge that corresponds to the first needle and a second gauge that corresponds to the second needle, and the controller may be configured to, based on the one or more preset conditions being satisfied, merge the first gauge and the second gauge to a single merged gauge that corresponds to one of the first and second needles, and indicate two different values on the merged gauge by using the corresponding one of the first and second needles and a virtual needle.

According to another aspect, a dashboard display of a vehicle includes a display panel having a speed display area that outputs a speed range of the vehicle at a first speed interval and an event display area that outputs an event information, the speed display area being configured to show a needle that indicates a current speed of the vehicle by rotating to thereby point to a corresponding position along the displayed speed range, and a controller. The controller is configured to, based on one or more preset conditions of the vehicle being satisfied, change a boundary of the speed display area from a first speed display area within the display panel to a second speed display area within the display panel that is different from the first speed display area, and to receive event information generated by an event during operation of the vehicle.

Implementations according to this aspect may include one or more of the following features. For example, the controller may be configured to, based on the one or more preset conditions of the vehicle being satisfied, change the event display area from a first event display area within the display panel to a second event display area within the display panel that is different from the first event display area. The changed boundary of the speed display area may correspond to the event, and one or more of display size, display position, or display shape of the first speed display area may be different from the corresponding ones of the second speed display. In some cases, the event display area may be reduced when the speed display area is increased, and the event display area may be increased when the speed display area is reduced. The event information generation may include generation of a collision probability warning between the vehicle and an object located outside the vehicle, and the speed display area and the event display area may be progressively reduced and increased, respectively, based on an increase of the collision probability. The controller may be configured to, based on the collision probability being above a threshold value, provide to the event display area to be displayed a captured image of the object located outside the vehicle.

In some implementations, the first speed display area may output a first speed range of the vehicle, and the second speed display area may output a second speed range of the vehicle, the first speed range and the second speed range having a different maximum displayed speed range or a different speed interval or both. The controller may be configured to, based on the one or more preset conditions of the vehicle being satisfied, change at least one of a minimum displayed speed range or a maximum displayed speed range according to one or both of a size of the speed display area and the current speed of the vehicle. The controller may be configured to, based on the one or more preset conditions of the vehicle being satisfied, change the speed interval according to a size of the speed display area. In some cases, the needle may be a first needle, the dashboard display may include a second needle, the controller may be configured to provide to be displayed a first gauge that corresponds to the first needle and a second gauge that corresponds to the second needle, and the controller may be configured to, based on the one or more preset conditions being satisfied, replace one of the first and second gauges with a third gauge, and indicate a desired value on the third gauge by rotating the corresponding one of the first and second needles.

DETAILED DESCRIPTION OF THE DISCLOSURE

A vehicle according to implementations disclosed below may include cars, motorcycles, and the like. The vehicle may be an internal combustion vehicle having an internal combustion engine as a power source, a hybrid vehicle having an engine and an electric motor as power sources, an electric vehicle having an electric motor as a power source, and so on. In the following description, a left side of a vehicle refers to a left side in a driving direction of the vehicle, and a right side of the vehicle refers to a right side in the driving direction.

Figure 1A:
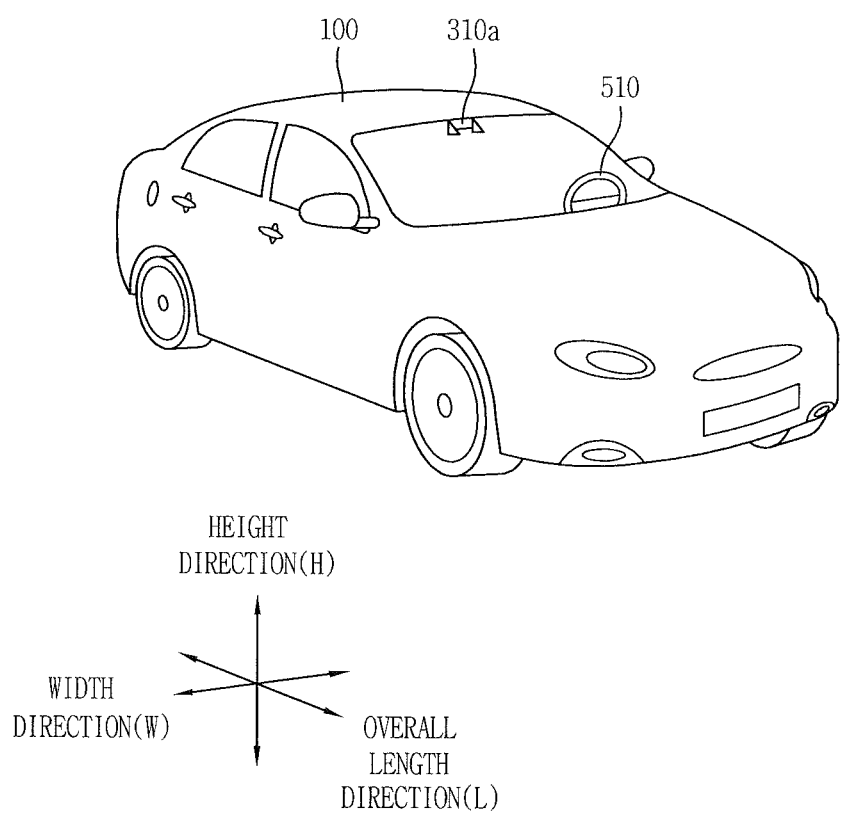
FIG. 1A is a schematic view illustrating an external appearance of an example vehicle.

Referring to FIG. 1A, a vehicle 100 may include wheels turning by a driving force, and a steering apparatus 110 for adjusting a driving (ongoing, moving) direction of the vehicle 100.

The vehicle 100 may be a manual vehicle that is driven by driver's manipulations and/or an autonomous vehicle for which at least one of a change in a driving direction, acceleration and deceleration is executed by a program.

The vehicle 100 may be switched into an autonomous mode or a manual mode based on a user input.

For example, the vehicle 100 may be switched from the manual mode into the autonomous mode or from the autonomous module into the manual mode based on various information. The various information, for example, may include a user input received through a user interface, driving condition information generated from sensors provided in the vehicle 100, driving condition information received from the exterior and the like. In some cases, the vehicle may include a phased or partial autonomous mode where some driver input/attention is still required.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

Figure 1B:
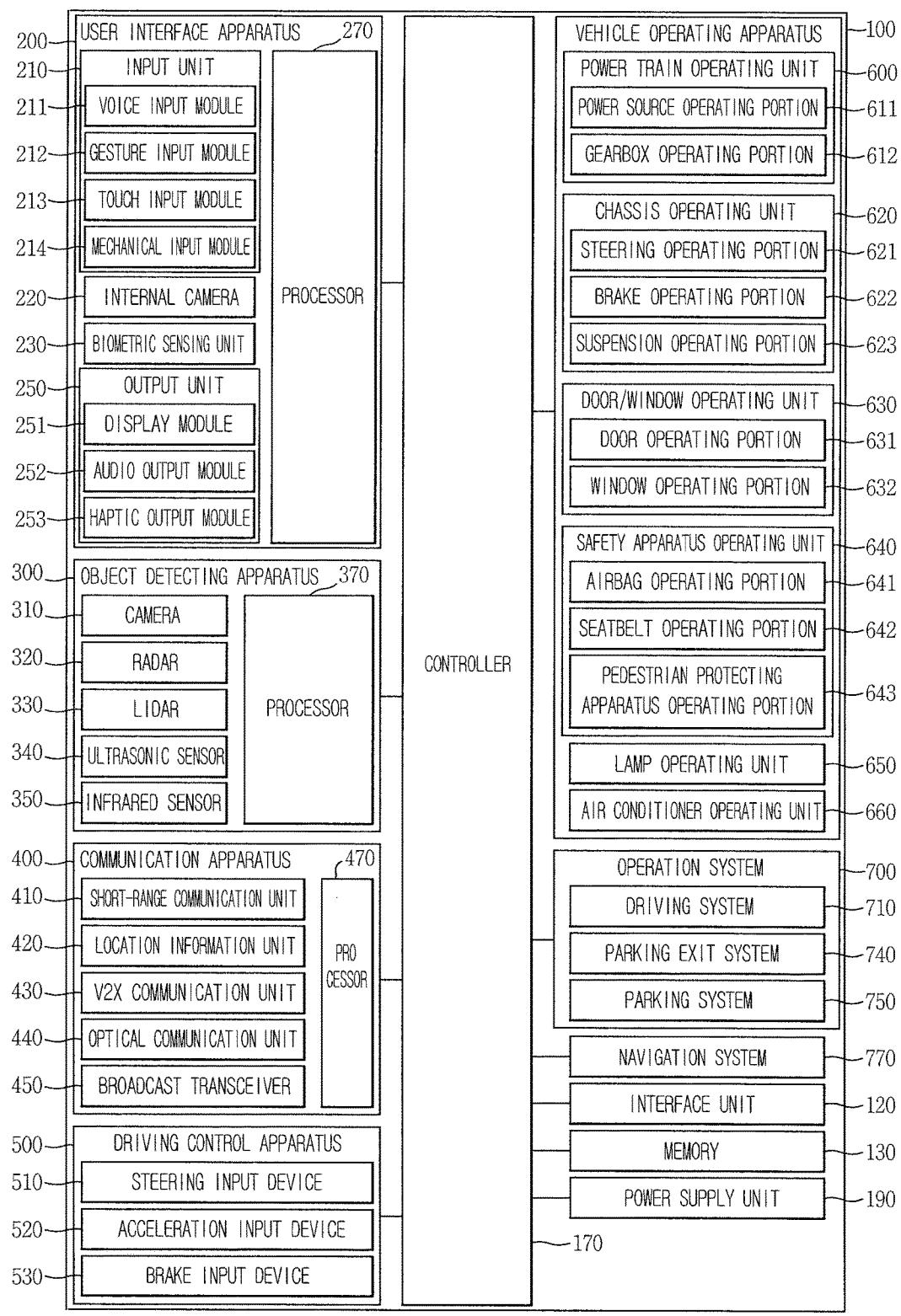
FIG. 1B is a block diagram illustrating example components provided in the vehicle.

Referring to FIG. 1B, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to some implementations, the vehicle 100 may further include other components which are not described in this description, or may not include some of those described components.

The user interface unit 200 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to some implementations, the user interface apparatus 200 may include more components in addition to components to be explained in this specification or may not include some of those components to be explained in this specification.

The input unit 210 may allow the user to input information. Data collected in the input unit 120 may be analyzed by the processor 270 and processed as a user's control command.

The input unit 210 may be disposed within the vehicle. For example, the input unit 210 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to some implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an implementation, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

In some cases, the user interface apparatus 200 may include a plurality of display modules 251a to 251g.

The display module 251 may be disposed on one area of a steering wheel, one area 251a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an implementation, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

In some cases, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100. The object may include a lane, another vehicle, a pedestrian, a two-wheeled vehicle, a traffic signal, light, a road, a structure, a speed hump, a geographical feature, an animal or the like.

The lane may be a driving lane, a lane next to the driving lane or a lane on which another vehicle comes in an opposite direction to the vehicle 100. The lanes may be a concept including left and right lines forming a lane.

The another vehicle may be a vehicle which is moving around the vehicle 100. The another vehicle may be a vehicle located within a predetermined distance from the vehicle 100. For example, the another vehicle may be a vehicle which moves before or after the vehicle 100.

The pedestrian may be a person located near the vehicle 100. The pedestrian may be a person located within a predetermined distance from the vehicle 100. For example, the pedestrian may be a person located on a sidewalk or roadway.

The two-wheeled vehicle may refer to a vehicle (transportation facility) that is located near the vehicle 100 and moves using two wheels. The two-wheeled vehicle may be a vehicle that is located within a predetermined distance from the vehicle 100 and has two wheels. For example, the two-wheeled vehicle may be a motorcycle or a bicycle that is located on a sidewalk or roadway.

The traffic signals may include a traffic light, a traffic sign and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

In some cases, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

According to an implementation, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an implementation, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an implementation, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an implementation, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an implementation, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

In some cases, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some implementations, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some implementations, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some implementations, the vehicle operating apparatus 600 may further include other components in addition to the components described, or may not include some of the components described.

In some cases, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In some cases, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In some cases, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some cases, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

According to some implementations, the operation system 700 may further include other components in addition to components to be described, or may not include some of the components to be described.

In some cases, the operation system 700 may include a processor. Each unit of the operation system 700 may individually include a processor.

According to some implementations, the operation system may be a sub concept of the controller 170 when it is implemented in a software configuration.

Moreover, according to some implementation, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to some implementations, the navigation system 770 may update prestored information by receiving information from an external device through the communication apparatus 400.

According to some implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some cases, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to some implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Figure 2:
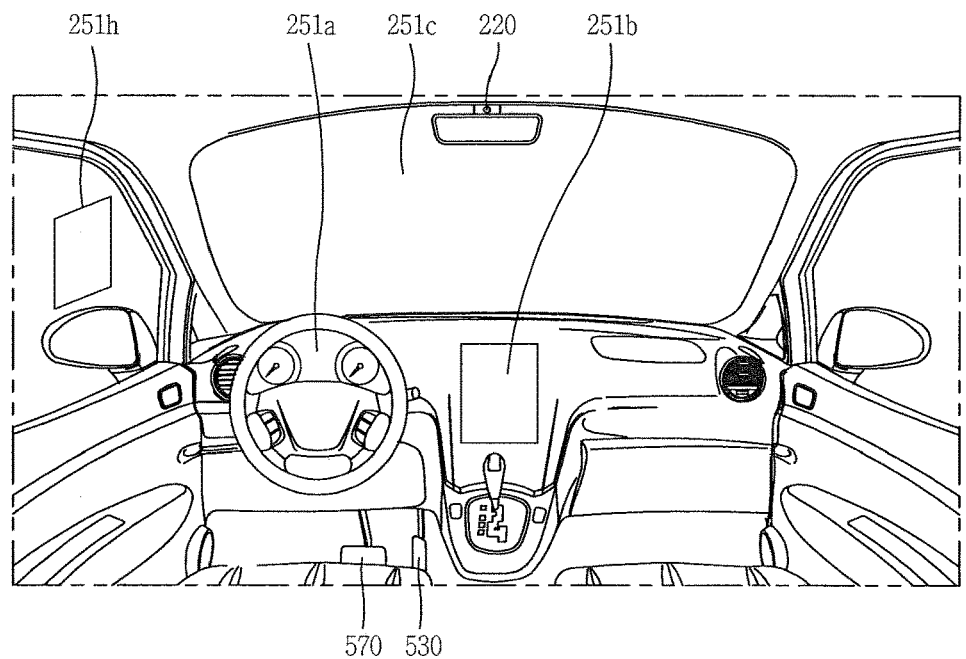
FIG. 2 is a front interior view illustrating an example interior of the vehicle.

FIG. 2 is a view illustrating an inside of a vehicle in accordance with an implementation of the present disclosure.

The vehicle 100 includes therein a driver seat and a front passenger seat (seat next to the driver seat), and a dashboard is disposed at the front of the driver seat and the front passenger seat. The dashboard includes various gauges required for driving.

The dashboard includes a cluster or dashboard display 251a for outputting a speedometer and information necessary for driving, a steering wheel for manipulating (changing) a driving direction of the vehicle, and a center fascia with a board for adjusting an audio and an air conditioner.

The center fascia is located between the driver seat and the front passenger seat. The center fascia is a portion at which the dashboard and a shift lever perpendicularly meet with each other. A controller of audio/air conditioner/heater, a navigator, a ventilation, a cigar jack and an ashtray, a cup holder and the like are installed on the center fascia. When the dashboard is formed in a shape like an alphabet T, the center fascia may serve as a wall partitioning the driver seat and the front passenger seat, together with a center console.

To support and improve functions of the vehicle 100, various types of displays are disposed within the vehicle 100.

The plurality of displays are installed on different positions and output different types of information according to installed positions.

The plurality of displays may be divided into different types according to their installed positions. For example, the plurality of displays may include at least one of a dashboard display 251a, a head-up display (HUD), a center information display (CID) 251b, a back mirror display, a side mirror display, a front passenger seat display, and a steering wheel display.

The dashboard display 251a is a display for providing a driver with information related to a driving state of the vehicle 100 and an operation of each device or apparatus equipped in the vehicle 100, such that the driver can safely drive the vehicle 100. The dashboard display 251a is located at the rear of the steering wheel based on the driver seat. The dashboard display 251 outputs thereon a speedometer notifying a driving speed, a tripmeter notifying a driven distance, a tachometer notifying a revolution per minute (RPM) of an engine, a fuel gauge, a water temperature gauge, an engine temperature gauge, and various warning lamps.

The HUD is a device for projecting a virtual image on a windshield of the vehicle 100, and provides thereon a current speed of the vehicle 100, a fuel level, road guidance information and the like to minimize an unnecessary movement of the driver's gaze away from the front of the vehicle.

A display that is located between the driver seat and the front passenger seat on the dashboard of the vehicle 100 may be referred to as a center information display and/or a center fascia display.

When one of the center information display and the center fascia display is provided in the vehicle 100, the one display may output a map image guiding a path up to a destination or corresponding to a current position, or user interfaces associated with controls of various devices equipped in the vehicle 100. In addition, when the vehicle 100 is connected to a mobile terminal, the one display may output a screen provided on the mobile terminal.

When both of the center information display and the center fascia display are provided in the vehicle 100, the center fascia display is located below the center information display. In this instance, the center information display outputs the map information and the center fascia display outputs the user interfaces associated with the controls of the various devices equipped in the vehicle 100. That is, the driver may check the path using the center information display, and input a control command information related to a temperature adjustment, a wind adjustment, an audio or the like within the vehicle 100 using the center fascia display.

Figure 3:
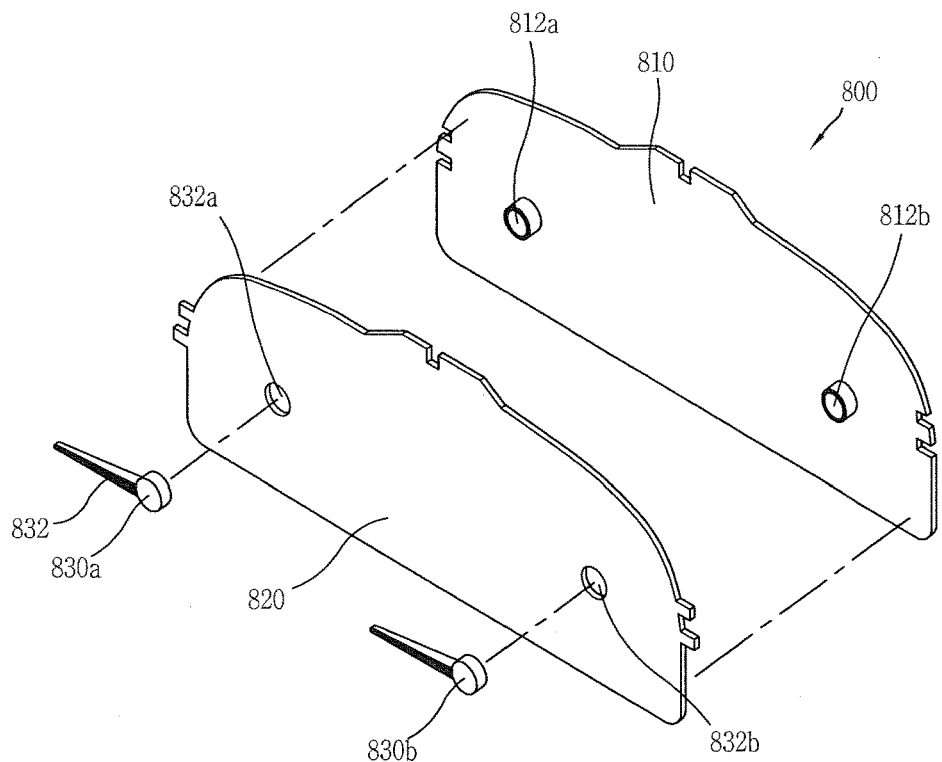
FIG. 3 is an exploded view illustrating an example structure of a dashboard display.

FIG. 3 is a conceptual view illustrating a structure of a dashboard display in accordance with one implementation of the present disclosure.

As illustrated in FIG. 3, an example dashboard display 800 includes a base board 810, a display panel 820, and one or more needles 830a, 830b.

The display 820 may be disposed on the base board 810, and the at least one of the one or more needles 830a, 830b may be disposed on the display 820.

However, those components may not be limited to this arrangement type. Alternatively, those components may be excluded, replaced or arranged in a different manner, if necessary. For example, the dashboard display 800 may not be provided with any needle. In this instance, the needle may be implemented as a virtual graphic object.

The dashboard display 800 outputs information processed in the vehicle 100. For example, the dashboard display 800 may output execution screen information regarding an application program activated in the vehicle 100 or information regarding a user interface (UI) and a graphic user interface (GUI) according to the execution screen information.

The display 820 may include at least one of a liquid crystal display (LCD), a thin film transistor-LCD (TFT LCD), an organic light-emitting diode (OLED), a flexible display, a three-dimensional (3D) display and an e-ink display.

Also, the display 820 may be provided by two or more according to a configuration of the dashboard display 800. In this instance, the dashboard display 800 may be configured such that a plurality of displays are arranged on one surface by being spaced apart from or integrated with one another or arranged on different surfaces, respectively.

The base board 810 may be provided with at least one fixing portion 812a, 812b for fixing the at least one needle 830a, 830b. The at least one needle 830a, 830b is fixed to the at least one fixing portion 812a, 812b through at least one hole 832a, 832b formed through the display 820, and turns by a driving portion centering on an axis.

The at least one needle 830a, 830b may include a pointer 832, and a driving portion for allowing the pointer 832 to turn to point at a scale (or a specific numerical value) of a gauge output on the display 820. The pointer 832 is tapering to point at a scale of a gauge.

The driving portion is a component of applying power for turning the pointer 832, and may be configured as a motor, an actuator, a magnet and the like.

The at least one needle 830a, 830b may further include a light-emitting portion, and one surface of the pointer 832 may be opaque or transparent to allow transmission of light emitted from the light-emitting portion therethrough. The light-emitting portion may make the pointer 832 have a predetermined color, such that the driver can accurately recognize a scale pointed by the pointer even at night.

A controller of the dashboard display 800 controls information output on the display 820, and controls the at least one needle 830 to correspond to the output information. For example, the controller may control the display 820 to output a speedometer and control the driving portion of the needle 830 such that the pointer 832 points at a current speed of the vehicle 100.

Hereinafter, implementations related to control methods which can be implemented on the dashboard display having such configuration will be described with reference to the accompanying drawings. It will be obvious to those skilled in the art that the present disclosure can be specified into other particular forms without departing from the spirit and essential characteristics of the present disclosure.

The following description of drawings will be given in a clockwise direction or from top to bottom on the basis of a drawing given on a left top.

A dashboard display according to the present disclosure may freely output various types of information according to priorities. As a related example, hereinafter, description will be given of a flow of a control method of outputting information related to driving of the vehicle 100 and controlling a display and a needle, by combination of the display and the needle.

Figure 4:
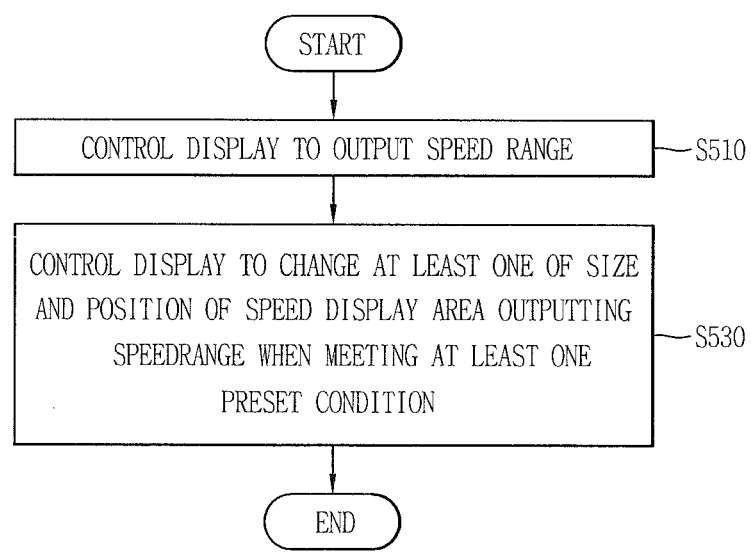
FIG. 4 is a flowchart illustrating an example method for controlling the dashboard display.

FIG. 4 is a flowchart illustrating a method for controlling a dashboard display in accordance with one implementation of the present disclosure.

First, the controller controls the display to output a range of speed (S410).

Here, the controller may be a processor provided in the dashboard display and/or the controller 170 of the vehicle 100 illustrated in FIG. 1.

The range of speed refers to a range of speed in which the vehicle 100 can travel, and has a minimum speed and a maximum speed. The minimum speed and the maximum speed may be preset at the stage of manufacturing the dashboard display at a factory. The maximum speed may vary depending on a vehicle and the minimum speed typically corresponds to 0 km/h.

In the present disclosure, km/h is used as a unit for indicating speed, for example, but it may vary according to other implementations. For example, mph (miles per hour) may be used.

The range of speed may be a speed gauge (or speedometer) having the minimum speed and the maximum speed. Hereinafter, the range of speed and the speed gauge may be used as the same meaning.

The range of speed is a virtual graphic object for guiding a current speed of the vehicle, and includes a plurality of scales.

Each of the plurality of scales corresponds to a different reference speed, and indicates one reference speed in the range between the minimum speed and the maximum speed. That is, the plurality of scales guide different speeds between the minimum speed and the maximum speed.

The plurality of scales may be arranged with being spaced apart from one another by predetermined gaps. For example, for first to third scales that are consecutively arranged, a distance between the first scale and the second scale may be equal to a distance between the second scale and the third scale.

The distance between the scales reflects a speed interval or a unit speed (or a unit velocity (UV)). Since the plurality of scales are arranged with being spaced by the predetermined gaps, speeds guided by the respective scales sequentially increase according to an arrangement order. For example, in case where a unit speed is 10 km/h, when the first scale corresponds to 50 km/h, the second scale corresponds to 60 km/h and the third scale corresponds to 70 km/h.

In some case, the reference speeds guided by the scales may vary in response to a change in the unit speed. For example, when the unit speed changes from 10 km/h to 20 km/h, the second scale guides 70 km/h other than 60 km/h.

The needle points at a portion between a scale corresponding to the minimum speed and a scale corresponding to the maximum speed of the range of the speed, and moves to indicate a current speed of the vehicle 100. The controller moves the needle to point at a current speed of the vehicle 100 by considering a unit speed corresponding to a gap between the scales.

For example, while the vehicle 100 is stopped, the needle may point at a scale corresponding to 0 km/h as the minimum speed. As another example, the need may point at a scale corresponding to 90 km/h while the vehicle 100 is driving at the speed of 90 km/h, and point at a position corresponding to 90 km/h when a corresponding scale is not present.

The needle moves closer to the maximum speed from the minimum speed when the vehicle 100 is accelerated, and moves closer to the minimum speed from the maximum speed when the vehicle 100 is decelerated.

For example, when scales between the minimum speed to the maximum speed are arranged in a clockwise direction, the needle may turn in the clockwise direction upon accelerating the vehicle and turn in a counterclockwise direction upon decelerating the vehicle. As another example, when the scales between the minimum speed and the maximum speed are arranged in the counterclockwise direction, the needle may turn in the counterclockwise direction upon accelerating the vehicle and turn in the clockwise direction upon decelerating the vehicle.

Next, the controller controls the display to change at least one of size and position of a speed display area, on which the range of speed is output, when at least one preset condition is satisfied (S430).

The controller may determine whether or not at least one of a plurality of preset conditions meets, on the basis of information received from various devices. The various devices may be the sensor unit 120 and those apparatuses 200 to 600 illustrated in FIG. 1.

As one example, the controller may sense a generation of an event from at least one application, and determine whether or not the sensed event meets a preset condition.

The application is a concept including a widget or a home launcher, and refers to every type of program which can be activated in the vehicle 100. Therefore, the application may be a program performing a function of a web browser, a video reproduction, a message transmission and reception, a schedule management or an application update.

For example, the event generation may be a presence of a missed call, a presence of an application to be updated, a reception of a message, starting, turning off, an autonomous driving ON/OFF state, pressing of an LCD awake key, an alarm, an incoming call, a missed notification and the like.

As another example, the event generation may be a generation of warning set in an advanced driver assistance system (ADAS) or a performance of a function set in the ADAS. For example, when a forward collision warning is generated, when a blind spot detection is generated, when a lane departure warning is generated, when a lane keeping assist warning is generated or when an autonomous emergency braking is generated, it may be determined as the event generation.

As another example, when a gear of the vehicle is switched from a forward gear to a reverse gear, when acceleration greater than a predetermined value is generated, when deceleration greater than a predetermined value is generated, or when a power source device is switched from an internal-combustion engine to a motor or from the motor to the internal-combustion engine, it may also be determined as the event generation.

In addition, when various ECUs provided in the vehicle 100 perform specific functions, it may also be determined as the event generation.

When the generated event meets the at least one preset condition, the controller controls the display to change at least one of size and position of the speed display area on which the range of speed is output.

The size of the speed display area may be reduced or increased according to a preset condition. The size of the speed display area may differ depending on a satisfied condition. For example, when a first condition is met, the speed display area may be transformed into a first size. On the other hand, when a second condition is met, the speed display area may be transformed into a second size which is different from the first size.

In response to the change in the size of the speed display area, a size of information output on the speed display area may increase. For example, a size of each scale may vary in proportion to the size of the speed display area. As the size of the speed display area changes, a type of information output on the speed display area may differ.

When the speed display area increases more in size than its initial size, new information which has not been output before may additionally be output on the speed display area. On the other hand, when the speed display area is reduced more in size than its initial size, at least one of previously-output information may disappear from the speed display area. For example, a new scale may be added between the previously-output scales, or at least one of the previously-output scales may disappear. In this instance, a unit speed between the scales may change.

As another example, while the range of speed is output in a first manner, when the size of the speed display area changes, the range of speed may be output in a second manner different from the first manner.

In response to the change in the position and/or the size of the speed display area, a needle that is activated may vary or the position and/or size of the needle may vary. Here, "the activation of the needle" refers to a generation of a movement for guiding specific information in relation to a gauge output on the dashboard display. On the other hand, "deactivation of the needle" is a stopped state of the needle without a movement, namely, refers to a state without a relation to every gauge output on the dashboard display.

When the event is generated, event information related to the generated event should be provided to a driver.

Of the entire area of the dashboard display, an area where the range of speed is output is defined as "speed display area" and an area where event information generated in the vehicle 100 and/or devices equipped in the vehicle 100 is output is defined as "event display area."

According to the conventional method, since the speedometer and the tachometer occupy most of the display area of the dashboard display, a space for outputting event information is too small. That is, a fixed event display area is too narrow and thus outputs only a limited quantity of information.

According to the present disclosure, however, the controller can change size and position of at least one of the event display area and the speed display area according to at least one preset condition.

For example, when an event satisfying a preset condition is generated while the range of speed is output on a first area, the speed display area may change from the first area into a new second area. That is, the boundary of the speed display, including its size, shape, and/or position, may be changed. Simultaneously, the event display area which is currently output on a third area may change into a new fourth area at the time when the speed display area changes from the first area into the second area. This change may be gradually executed by an animation effect.

In some implementations, the sizes of the speed display area and the event display area may be inversely proportional to each other. For example, when the speed display area becomes smaller, the event display area may increase. On the other hand, when the speed display area becomes larger, the event display area may be reduced.

For example, if event information should be preferentially provided to a driver rather than speed information in response to an event generation, the speed display area may be reduced and the event display area may increase such that the driver can recognize the event information at one view. Also, the event display area may be placed at a center of the entire display area and the speed display area may be moved to an edge area, thereby facilitating the more important event information to be recognized more preferentially than the speed information. This may result in the efficient use of the fixed display area of the dashboard display.

The speed display area and the event display area may change in a simultaneous or sequential manner, and the sizes and positions thereof organically change.

The speed display area and the event display area may also overlap each other, but an overlapped area therebetween should be minimized to avoid overlapping of output information. If different types of information are output on the overlapped area in an overlapping manner, the driver can feel difficult to recognize the information on the overlapped portion.

Accordingly, when a larger amount of event information should be output on the event display area, the event display area may more increase and the speed display area may be more reduced.

On the other hand, when there is no need to change the event display area resulting from a less amount of event information to be output on the event display area, the speed display area may be maintained in its size without a change.

In some cases, when the speed display area changes from the first area into the second area, at least one of size and position of the second area may differ according to a generated event (or a preset condition). This is because an amount of event information differs according to an event. Under the same condition, the size and position of the second area may differ when a first event is generated and when a second event different from the first event is generated.

Since the speed display area of outputting the range of speed and the event display area of outputting event information differ according to an event, a more dynamic information transfer to the driver is enabled.

Also, when importance (or priority) of an event is higher than that of speed, the event display area may be placed at the center of the dashboard display or set to be greater than the speed display area. Accordingly, the driver can intuitively recognize which information is more important on the basis of the positions and sizes of the speed display area and the event display area.

In some cases, the preset condition may be associated with a position of a needle. In more detail, the controller may control the display to change the size and position of at least one of the speed display area and the event display area, on the basis of the position of the needle.

The range of speed includes every speed at which the vehicle 100 can drive. This may cause an unnecessarily wasted space. For example, if a speed section is divided into a low-speed section and a high-speed section based on an intermediate speed between the minimum speed and the maximum speed, only the low-speed section is used but the high-speed section is not used when the vehicle 100 drives at a low speed. Since the speed of the vehicle changes with continuity, the minimum speed cannot change into the maximum speed within a short time such as one second.

The controller may calculate a range of speed in which the vehicle 100 can substantially drive within a predetermined time (hereinafter, referred to as 'controllable speed range'), taking into account acceleration and deceleration of the vehicle 100 based on a current speed of the vehicle 100. For example, when the vehicle 100 is currently driving at 80 km/h in a state that the minimum speed is 0 km/h and the maximum speed is 200 km/h, the controllable speed range may be calculated as a range of 50 km/h to 130 km/h. In this instance, of an entire section of a speed gauge, a first section ranging from 0 km/h to 50 km/h and a second section ranging from 130 km/h to 200 km/h may be unnecessarily wasted sections. This is because the vehicle 100 cannot enter the first section or the second section within a predetermined time in a current state.

When the controllable speed range is calculated, the speed display area may limitedly output thereon only the controllable speed range, other than the entire range of speed. According to the above example, scales corresponding to 50 km/h to 130 km/h may be output on the speed display area, but the first section ranging from 0 km/h to 50 km/h and the second section ranging from 130 km/h to 200 km/h may not be output. In other words, the controllable speed range is output but an output of other speed ranges is limited.

The entire section of the range of speed is divided into an unnecessary section which does not have to be output and a necessary section which has to be output, according to a current speed of the vehicle 100, namely, a position of a needle. Therefore, the controller may change the size and position of at least one of the speed display area and the event display area according to the position of the needle. In other words, the controllable speed range may differ in real time according to the current speed of the vehicle 100.

For example, the controller may control the display to output the speed display area on a first area and the event display area on a third area when the position of the needle is within a first range. As another example, the controller may control the display to output the speed display area on a second area and the event display area on a fourth area when the position of the needle is within a second range. As the position of the needle is moved from the first range into the second range, the speed display area may change from the first area into the second area and the event display area may change from the third area into the fourth area.

Accordingly, the display area of the dashboard display can efficiently be used.

The above-described control method according to the present disclosure can be realized into various forms, as illustrated in FIGS. 5 to 10. Hereinafter, in the following implementations, the same/like reference numbers are given to the same/like configurations to those of the foregoing implementations, and description thereof will be omitted.

Figure 5A:
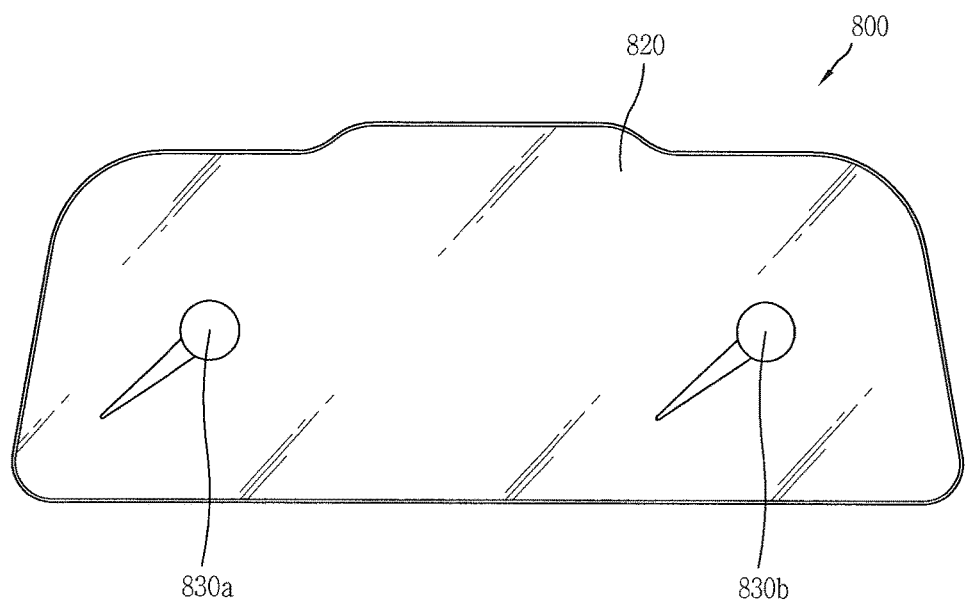
FIG. 5A is a front view of an example dashboard display during an off state.
Figure 5B:
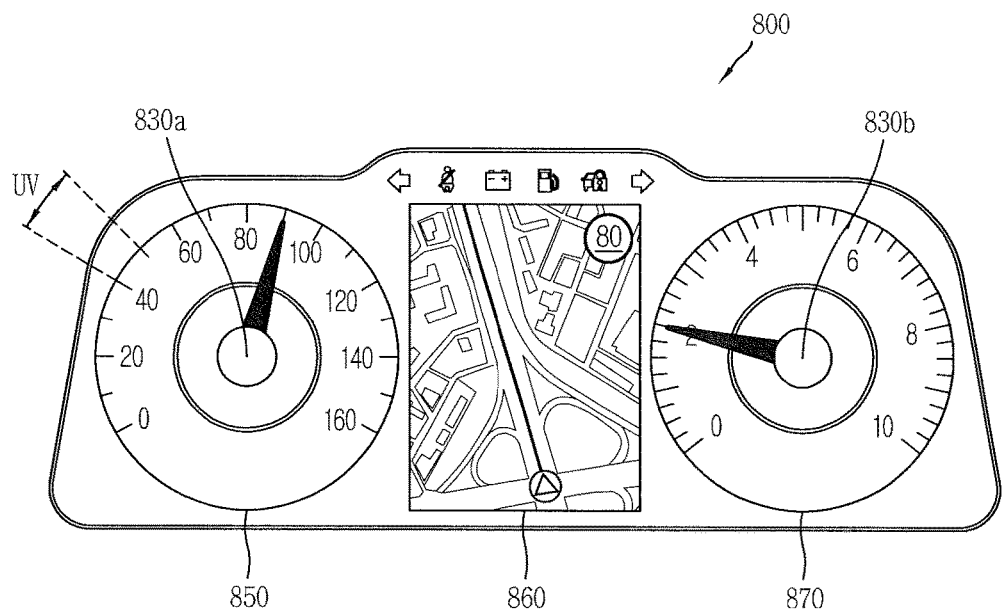
FIG. 5B is a front view of an example dashboard display during an on state.

FIG. 5A is an exemplary view of a dashboard display during a start-off of a vehicle, and FIG. 5B is an exemplary view illustrating a dashboard display during a start-on of a vehicle.

As illustrated in FIG. 5A, the dashboard display 800 may include a display 820 for outputting information thereon, and at least one needle 830a, 830b.

The needle 830a, 830b may be separated from the display 820 in a hardware configuration or configured as a virtual graphic object output on the display 820. When the needle 830a, 830b is configured as the virtual graphic object, the needle 830a, 830b may disappear when the display 820 is turned off and appear when the display 820 is turned on. In some cases, one of the needles 830a, 830b may be a virtual needle, while the other of the needles is a physical needle.

Hereinafter, for clarity, a configuration that the physically-existing needle 830, 830b is provided on the display 820 will be described as one example. However, the present disclosure may not be limited to this but may also be applicable even to an example that the needle is configured as the virtual graphic object.

When the vehicle 100 is stopped or otherwise in an off state, the display 820 is turned off or in a turn-off state. And, the needle 830a, 830b is moved to a preset initial position or in a state pointing at the initial position.

A state that the needle is stopped without a movement and does not guide specific information is defined as "inactive state," and a state that the needle moves to guide specific information is defined as "active state." The needle is in the inactive state during the start-off of the vehicle, and is in the active state or inactive state during the start-on of the vehicle. An implementation in which the needle is in the inactive state during the start-on will be described later with reference to FIG. 10.

In some cases, one surface of the needle 830a, 830b may be configured to output light with a predetermined color by a light-emitting portion. The controller may control the light-emitting portion not to output light during the off state of the vehicle, as illustrated in FIG. 5A, and control the light-emitting portion to output light during the on state of the vehicle, as illustrated in FIG. 5B. Also, the controller may control the light-emitting portion to output light with a different color according to the preset condition illustrated in FIG. 4.

FIG. 5B illustrates the dashboard display 800 during a start-on of a vehicle having an internal-combustion engine.

For a vehicle using an internal-combustion engine such as gasoline or diesel, the dashboard display 800 may output thereon a speed gauge for guiding a current speed of the vehicle, and an engine gauge for guiding a current revolution per minute (RPM) of the engine.

The engine gauge indicates a range of RPM including a minimum RPM and a maximum RPM that the engine can turn per a unit time.

A needle that is configured to point at a current speed of the vehicle 100 on the speed gauge is defined as a speed needle 830*a*, and a needle that is configured to point at a current RPM of the engine on the engine gauge is defined as an RPM needle 830*b*.

Of the entire area of the display, an output area of the speed gauge is defined as a speed display area 850, and an output area of the engine gauge is defined as an RPM display area 870.

For an electric vehicle using electricity, the engine gauge and the RPM needle 830*b* may be omitted.

In addition, the dashboard display 800 may output thereon event information corresponding to an event generated in the vehicle 100. An output area of such event information of the entire area of the display 820 is defined as an event display area 860.

When an event is generated, corresponding event information is output on the event display area 860. As one example of the event information, referring to FIG. 5B, when an event notifying a speed limit (80 km/h) of a currently-driving road is generated, event information may include the speed limit.

When an event is not generated or a predetermined time elapses after an event generation, the event display area 860 may output preset default screen information. The default screen information may include fuel efficiency (fuel ratio) of the vehicle 100, a current time, a driving direction, an internal temperature of the vehicle 100, a currently-output frequency of a radio, a volume level, a map guiding a current position and the like.

For example, the event display area 860 may output thereon an execution screen of a road guidance application. When the road guidance application is executed, the execution screen includes a map image, and a graphic object which guides a current position of the vehicle 100 on the map image. The driver may set a destination or a stopover using a user interface included in the execution screen. When the destination is set, the execution screen may include guidance information for guiding a path toward the destination.

Consequently, the entire area of the display 820 includes at least one of the speed display area 850 outputting the speed gauge, the event display area 860 outputting the event information, and the RPM display area 870 outputting the engine gauge.

In an initial state, the speed display area 850 may output thereon scales between a minimum speed and a maximum speed. For example, as illustrated in FIG. 5B, scales indicating speeds between the minimum speed 0 km/h and the maximum speed 160 km/h may be output, and a unit velocity (UV) (or a unit speed) between scales may be 10 km/h. The scales may be arranged in a manner that a speed gradually increase in a clockwise direction.

Similarly, the scales between a minimum RPM and a maximum RPM may be arranged on the RPM display area 870 in a manner that the RPM gradually increases in a clockwise direction. For example, as illustrated in FIG. 5B, the minimum RPM may be 0 rpm and the maximum RPM may be 10 rpm.

In some implementations, one or more of the scales being displayed may increase may be arranged so as to increase in counterclockwise direction.

The needle may include at least one of the speed needle 830*a* pointing at a current speed of the vehicle 100 on the speed display area 850, and the RPM needle 830*b* pointing at a current RPM of the engine on the RPM display area 870.

The dashboard display 800 controls the display 820 to change size and position of at least one of the speed display area 850, the event display area 860 and the RPM display area 870 according to at least one preset condition.

The at least one area may be output in a default size at a default position which are preset for each area. Afterwards, at least one of the size and position of the at least one area may vary according to a generated event. When the generated event is terminated, the at least one area is output again in the default size at the default position. Also, an area which is currently output may disappear from the display 820 according to a generated event.

Hereinafter, the way that the at least one area which is output in the default size at the default position varies according to an event generation will be described in more detail with reference to the accompanying drawings.

FIGS. 6A to 8B are exemplary views illustrating a dashboard display when an event is generated. The initial state illustrated in FIG. 5B may be switched into states illustrated in FIGS. 6A to 8B according to an event generation.

Figure 6A:
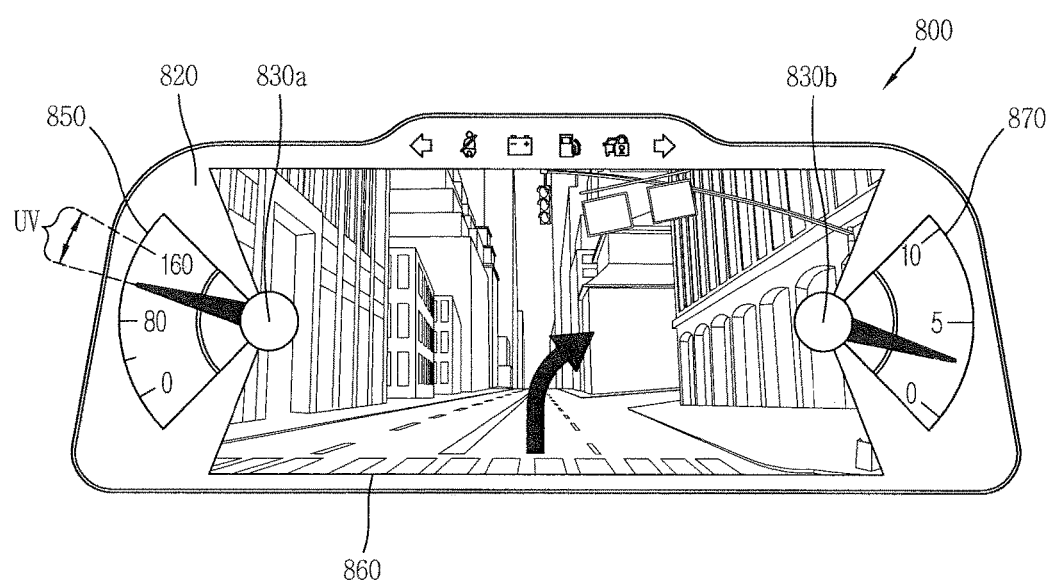
FIGS. 6A, 6B, 7, 8A, and 8B are front views illustrating example displays shown on the dashboard display for various events.
Figure 6B:
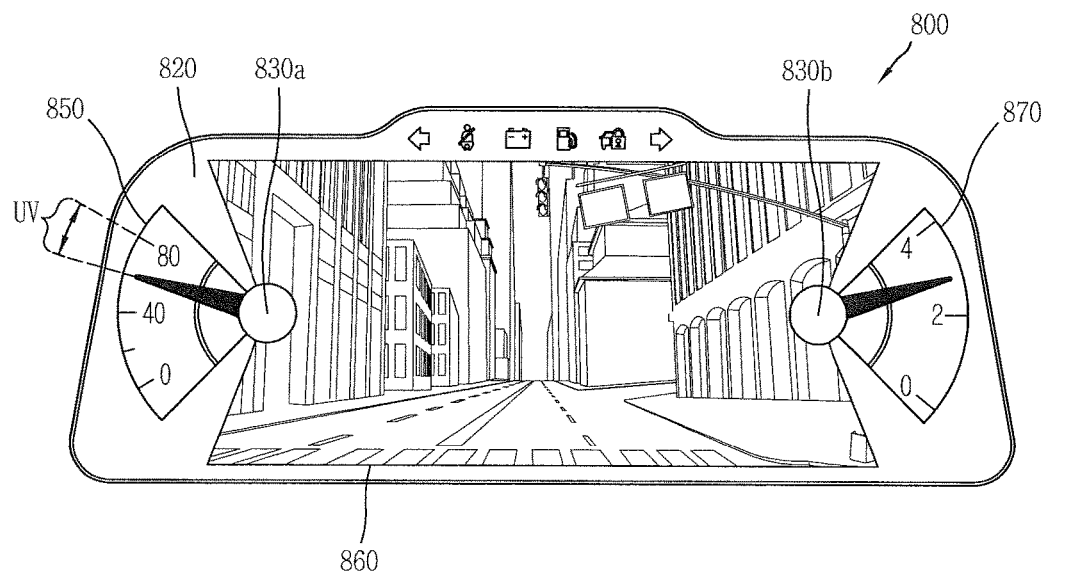
Figure 6B:
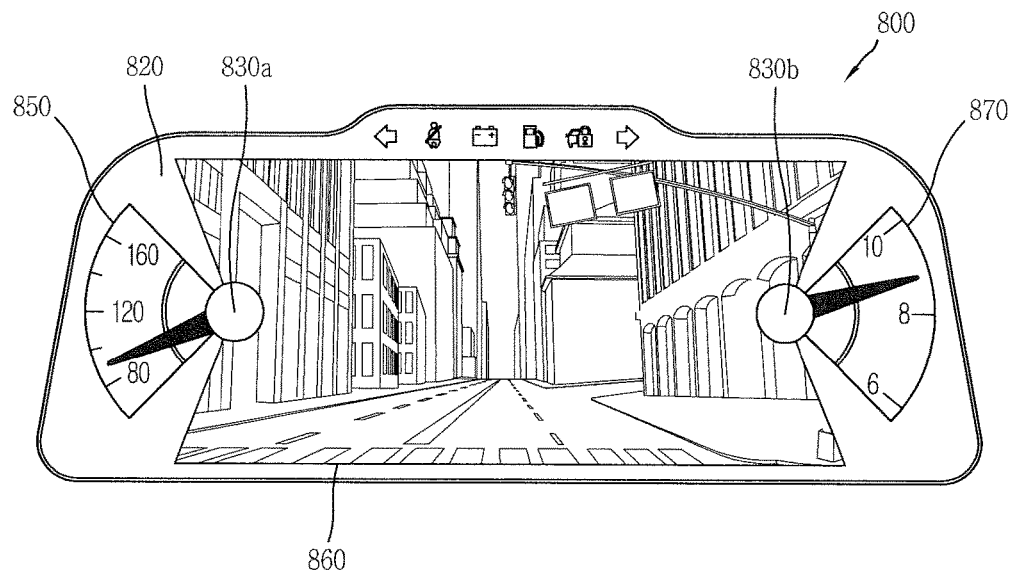
Figure 7:
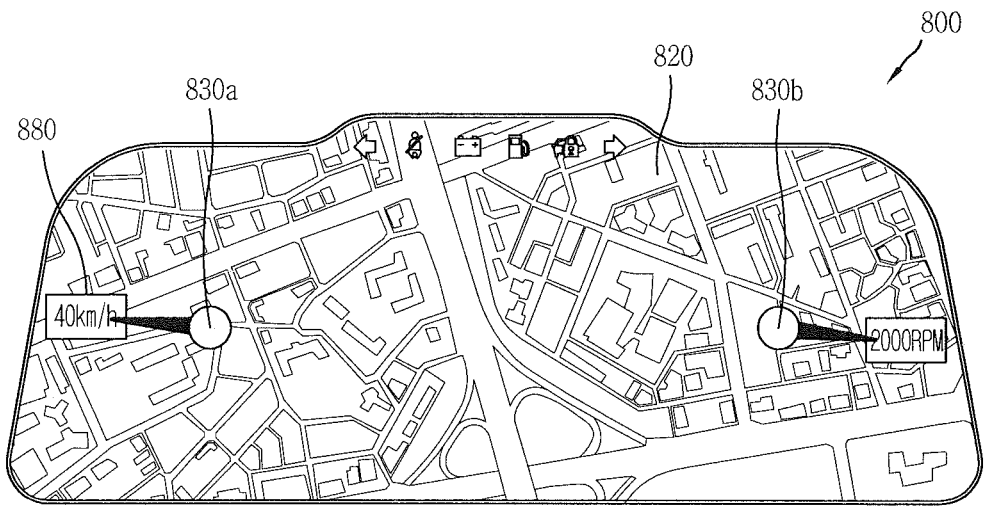
Figure 7:
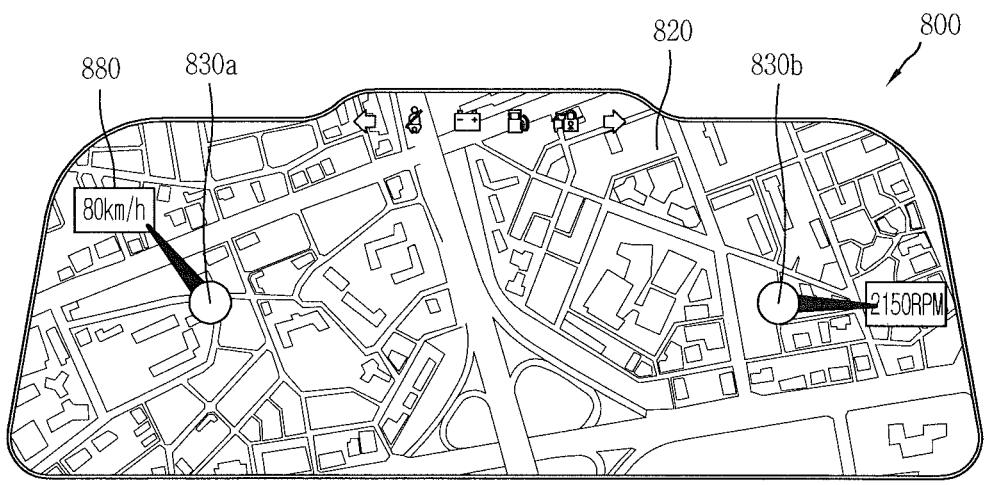

FIGS. 6A, 6B and 7 illustrate an implementation in which an event that the vehicle enters a complicated path, such as an intersection, is generated.

In case of entering a complicated path, it is difficult to guide an accurate path merely by using the map illustrated in FIG. 5B. To guide such complicated path, more information than a normal state should be displayed and the size of the event display area should increase as great as an amount of information to be displayed.

For example, upon entering a complicated path, a captured image by a camera provided on the vehicle may be output on the event display area 860. A graphic object guiding the path may be output on the captured image and thus augmented reality can be provided to the driver through the dashboard display 800. The augmented reality reflects a real world (real view) that the driver should look at through a windshield, and thus does not interfere with the driver's driving. Specifically, a front image which has been captured at a wider angle than the driver's view can be output on the dashboard display 800, which may result in avoiding a blind spot and enabling more secure driving.

As the event display area 860 is maximized on the dashboard display, the speed display area 850 and/or the RPM display area 870 should be minimized or disappear from the dashboard display 800.

A range of speed should inevitably be output on the dashboard display 800 according to the law. In this instance, the controller may set the event display area 860 based on an amount of event information to be output and set the speed display area 850 using the rest area. For example, when an event is generated from an application, the application may provide information regarding size and position of an area to output event information to the dashboard display 800. The dashboard display 800 may set the event display area 860 based on the information provided by the application, and set the speed display area 850 using the reset area.

In response to the change in the speed display area 850, the unit velocity (UV) between scales may change. After the change in the unit velocity, the dashboard display 800 may control a movement of the speed needle 830*a* based on the changed unit velocity such that the speed needle 830*a* points at a current speed of the vehicle 100.

For example, when the speed display area 850 is reduced in size, the reduced speed display area 850 may be so narrow to display every scale which has been output before. In this instance, as the unit velocity between the scales changes, a less number of scales than previously-output scales may be output. As illustrated in FIG. 6A, the range of speed may include the minimum speed (0 km/h) and the maximum speed (160 km/h) that the vehicle 100 can drive, and the unit velocity between the scales may change from a first speed interval of 10 km/h to a second speed interval of 40 km/h.

As another example, when the speed display area 850 extends, new scales which have not been present before may be added and thus the unit velocity may differ.

As another example, the unit velocity between the scales may be maintained as it is but a distance between the scales may differ. That is, when the speed display area 850 is reduced, every scale may be output within the speed display area 850 in a manner of shortening the distance between the scales.

The dashboard display 800 may control the driving portion of the speed needle 830*a* such that the speed needle 830*a* can point at a current speed of the vehicle 100 by considering the changed range of speed. That is, in response to the change in the range of speed, the movement of the speed needle 830*a* may differ.

In some implementations, as the speed display area 850 changes, the range of speed may be output in one of a first manner that the speed gradually increases in a clockwise direction or a second manner that the speed increases in a counterclockwise direction.

As the output manner of the range of speed changes, the movement of the speed needle 830*a* may differ according to the output manner. For example, when the vehicle 100 is accelerated, the speed needle 830*a* may turn in the clockwise direction in the first manner, and turn in the counterclockwise direction in the second manner.

In some cases, when the speed display area 850 is set, a minimum value and a maximum value of the range of speed output on the speed display area 850 may be decided. For instance, in a state that the minimum speed and the maximum speed for allowing the driving of the vehicle 100 have been set, at least one of the minimum value and the maximum value of the range of speed output on the dashboard display 800 may differ according to the speed display area 850.

In addition, the minimum value and the maximum value of the range of speed output on the speed display area 850 may differ according to a current speed of the vehicle 100. In more detail, at least one of the minimum value and the maximum value of the range of speed may differ according to the size of the speed display area 850 and the current speed of the vehicle 100.

In some implementations, the controller may calculate the controllable speed range by considering the acceleration and the deceleration of the vehicle based on the current speed of the vehicle, and output the controllable speed range on the speed display area 850. For example, as illustrated in FIG. 6B, when the current speed of the vehicle 100 is 60 km/h, the controllable speed range may be calculated as a range of 0 km/h to 80 km/h. When the current speed of the vehicle 100 is 90 km/h, the controllable speed range may be calculated as a range of 80 km/h to 160 km/h.

Accordingly, the small space of the dashboard display 800 can efficiently be used without a wasted space, and the driver can be provided with more information through the dashboard display 800.

The RPM display area 870 may also be controlled similar to the speed display area 850. For example, as the RPM display area 870 differs, a unit RPM between scales, a distance between scales, an output manner of an RPM range (clockwise or counterclockwise), and at least one of a minimum value and a maximum value of the RPM range may differ. For example, as illustrated in FIG. 6A, the unit RPM between the scales may differ, or as illustrated in FIG. 6B, at least one of the minimum value and the maximum value of the RPM range may differ.

As illustrated in FIGS. 6A and 6B, one portion of the display (e.g. speed display area 850) may be arranged to show increase in a clockwise direction while another portion (e.g. RPM display area 870) may show increase in a counterclockwise direction. In such cases, the two needles may both point toward the outside of the display area when in their initial or home positions. In such cases, a size of the display area between the two gauges that does not overlap with the needles, for example for the event display area 860, may be maximized. Here, the needle for speed may rotate inward in the clockwise direction to indicate the current speed, and the needle for RPM may rotate inward in the counterclockwise direction to indicate the current RPM.

As illustrated in FIG. 7, the dashboard display 800 may control the display 800 such that a numerical value 880, which corresponds to a current speed of the vehicle, is adjacent to one end of the speed needle 830*a*. The one end of the speed needle 830*a* may move as the current speed of the vehicle 100 changes, and the numerical value 880 may also change in response to the movement of the speed needle 830*a*. Since the numerical value indicating the current speed moves along the speed needle 830*a*, the driver can more accurately check the current speed.

When the numerical value 880 corresponding to the current speed is output, the dashboard display 800 may limit an output of the range of speed that includes the minimum value and the maximum value. That is, the dashboard display 800 can control the display 820 not to output the range of speed.

When the range of speed is not output, a space as great as the output area of the range of speed can be ensured, and the dashboard display 800 can use the ensured space as the event display area 860. In this instance, since the speed needle 830*a* continuously moves to point at the current speed, event information can be output on a wider space and the driver can intuitively recognize the current speed of the vehicle.

In some cases, the dashboard display 800 may set the event display area 860 according to a type of a generated event, and selectively change at least one of the speed display area 850 and the RPM display area 870. When an event is generated, the event display area 860 changes according to priority of information to be output, and accordingly at least one of the speed display area 850 and the RPM display area 870 changes.

Figure 8A:
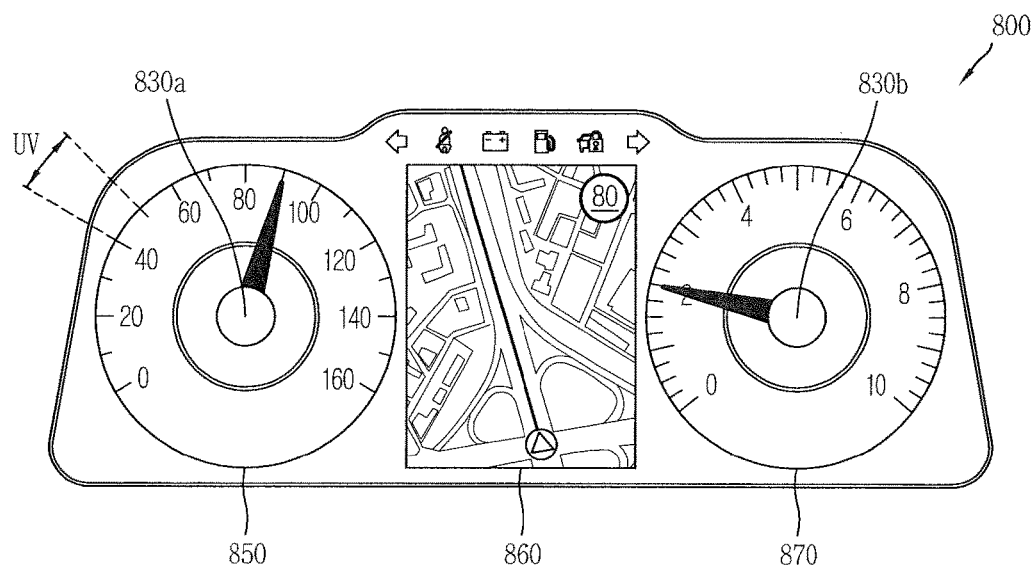
Figure 8A:
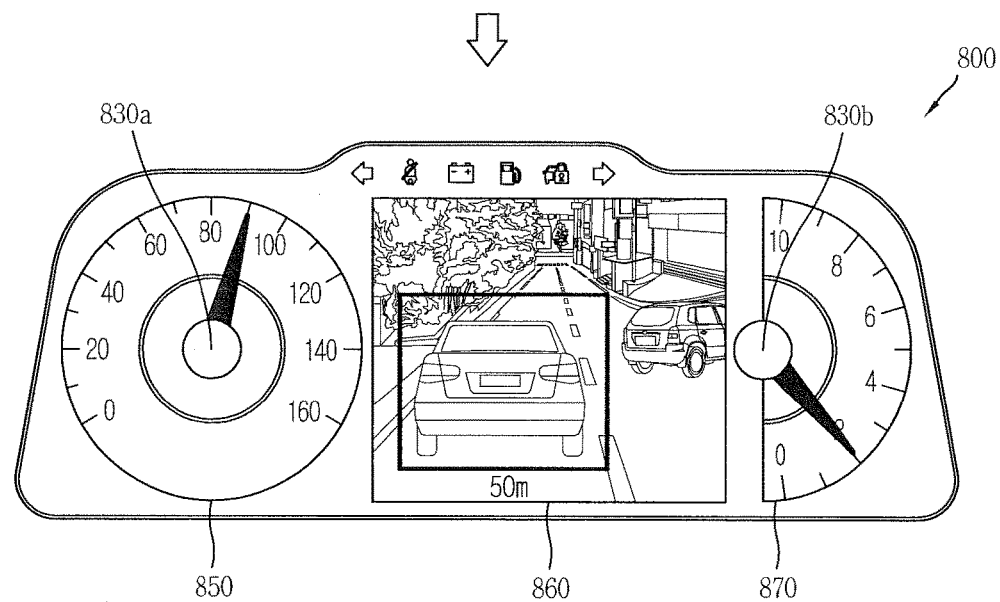
Figure 8B:
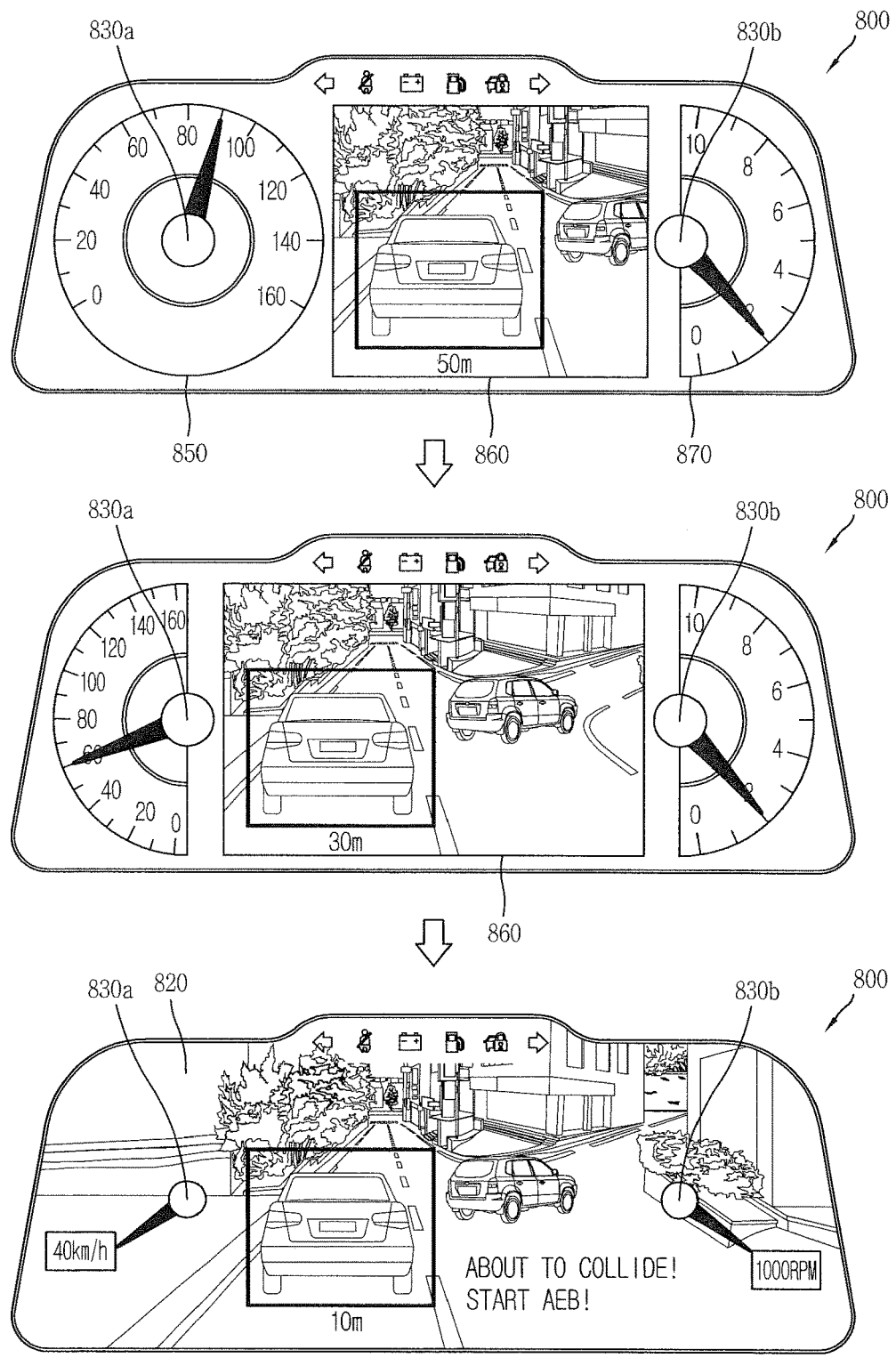

For example, as illustrated in FIG. 8A, one of the speed display area 850 and the RPM display area 870 is maintained as it is and the other may change or disappear from the dashboard display 800. As another example, as illustrated in FIG. 8B, the speed display area 850 and the RPM display area 870 may simultaneously change.

In some cases, a collision may occur between the vehicle 100 and an object located outside the vehicle 100. When an event of the collision probability is generated, the dashboard display 800 may output a warning, such as a captured image including the object generating the collision probability, on the event display area 860. In some cases, such warning may be output when the collision probability is greater than a threshold value.

In this instance, as the collision probability increases, the speed display area 850 may gradually decrease and the event display area 860 may gradually increase in size. This is because collision-related information should preferentially be provided to the driver as the collision probability increases.

In response to the increase in the collision probability, the event display area 860 may increase and thus an amount of information related to the collision probability can increase or a size of information output may increase.

For example, as illustrated in FIG. 8A, when the collision probability is within a first range, a part of an image guiding the object with the collision probability may be output on the event display area 860.

As illustrated in FIG. 8B, when the collision probability is within a second range, the event display area 860 may extend enough to output the entire image.

When the collision probability is within a third range, the range of speed may disappear from the dashboard display 800 and the numerical value illustrated in FIG. 7 may appear. In this instance, the dashboard display 800 may output thereon a surround view including merged images captured by a plurality of cameras.

Here, the third range refers to the highest level of the collision probability, the first range refers to the lowest level of the collision probability, and the second range refers to a level between the first range and the third range.

At least one of the speed display area 850, the event display area 860 and the RPM display area 870 may differ according to the position of the speed needle 830*a* and/or the position of the RPM needle 830*b*.

Figure 9A:
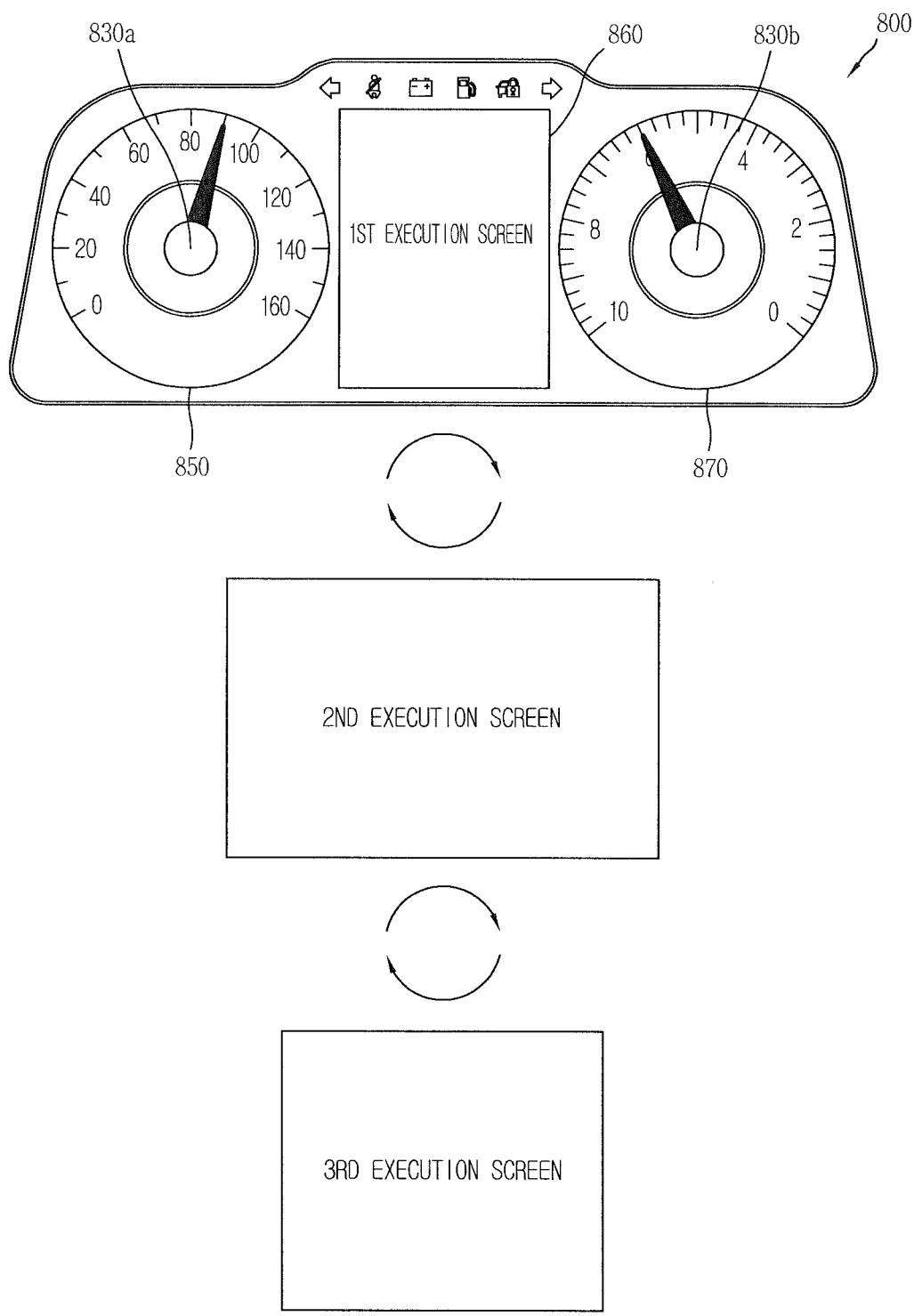
FIGS. 9A and 9B are front views illustrating examples of information being output to the dashboard display according to a position of a needle.
Figure 9B:
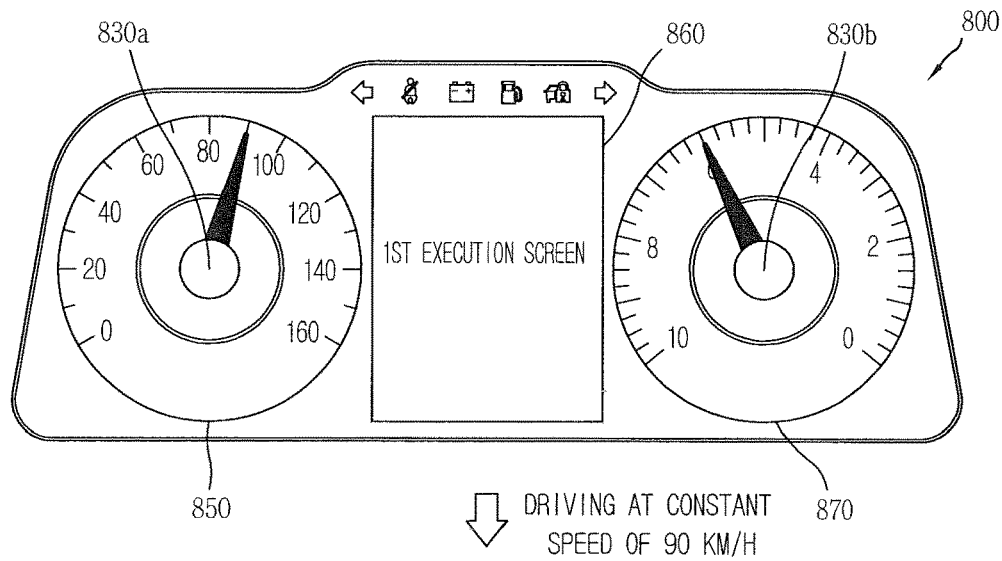
Figure 9B:
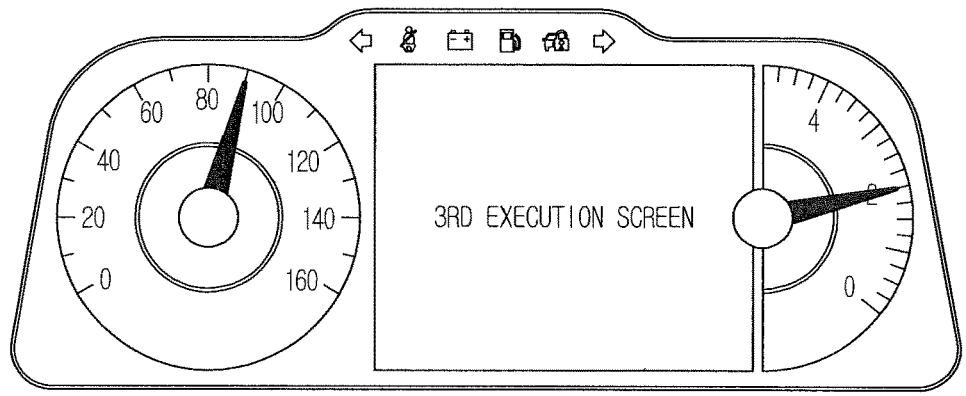
Figure 9B:
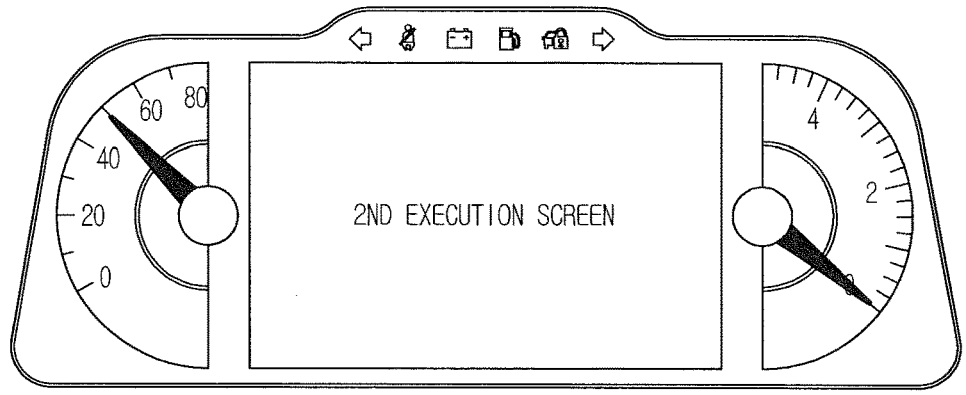

FIGS. 9A and 9B are exemplary views illustrating a dashboard display outputting information in a different manner according to a position of a needle.

The event display area 860 may output an execution screen of a currently-executed application. For example, when a road guidance application is executed, an execution screen of the road guidance application may be output on the event display area 860, and the execution screen may include a map image, and a graphic object for guiding a current position of the vehicle 100 on the map image.

In some cases, the application may provide execution screens with different sizes. Due to the different sizes of the execution screens, an amount of information included in each execution screen may differ. For example, as illustrated in FIG. 9A, a second execution screen having a second size may include information related to more regions, compared with a first execution screen having a first size.

The dashboard display 800 may select one of the execution screens with the different sizes based on the speed needle 830*a* and/or the RPM needle 830*b*, and control the display 820 to output the selected execution screen. At least one of the event display area 860, the speed display area 850 and the RPM display area 870 may change according to a size of the selected execution screen.

For example, as illustrated in FIG. 9B, when a first execution screen is selected based on the speed needle 830*a* and the RPM needle 830*b*, the speed range and the RPM range may be output to correspond to the size of the first execution screen.

Afterwards, when the RPM needle 830*b* moves in response to driving at a constant speed, a third execution screen may be selected based on the position of the RPM needle 830*b*. In this instance, the event display area 860 and the RPM display area 870 change according to the position of the RPM needle 830*b* and the speed display area 850 is maintained as it is. Responsive to the change in the RPM display area 870, at least one of the minimum value and the maximum value of the RPM range may change.

Continuously, when the current speed of the vehicle 100 is decelerated from 90 km/h to 50 km/h, the speed needle 830*a* may move and the second execution screen may be selected based on the position of the speed needle 830*a*. In this instance, the dashboard display 800 may change the speed display area 850 and the event display area 860 based on the position of the speed needle 830*a*. Responsive to the change in the speed display area 850, at least one of the minimum value and the maximum value of the speed range may change.

Since the needle changes in position in real time according to a current state of the vehicle and the event display area 850 changes according to the position of the needle, the driver can be provided with a user interface optimized for the current state of the vehicle.

In some cases, the dashboard display may display different gauges in a separating manner or merging manner.

Figure 10:
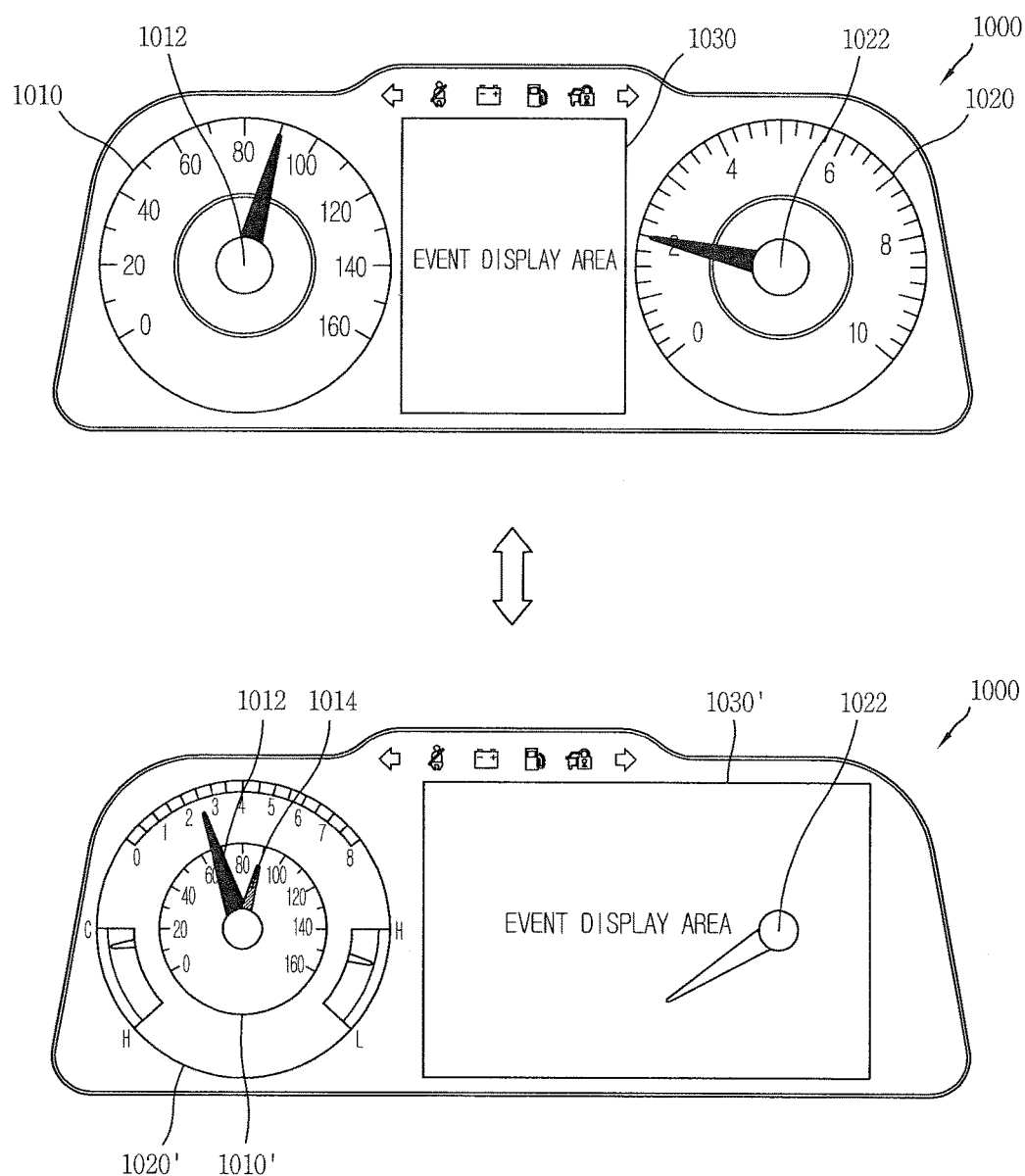
FIG. 10 is a front view illustrating an example merging of first and second gauges that are output on the dashboard display.

FIG. 10 is an exemplary view illustrating an implementation in which first and second gauges currently output on a dashboard display are merged into one.

As illustrated in FIG. 10, needles may include first and second needles 1012 and 1022 pointing at different types of information on different positions, and a dashboard display 1000 may output a first gauge 1010 corresponding to the first needle 1012, and a second gauge 1020 corresponding to the second needle 1022. Also, event information may be output on an event display area 1030.

In some cases, when the event display area changes (e.g., 1030→1030') due to an event generation, the dashboard display 1000 may control its display to merge the first gauge 1010 and the second gauge 1020 into one area for output, and also control the display to output a virtual third needle 1014 corresponding to one (e.g., 1022) of the first and second gauges on the one area.

As illustrated in FIG. 10, the second gauge 1020 may be merged onto a position where the first gauge 1010 is output. In this instance, an event display area 1030' may be output in an extending manner on a position from which the second gauge 1020 has disappeared, and the second needle 1022 is deactivated. As the first and second gauges are merged with each other, the third needle 1014 corresponding to one gauge 1010' of the merged gauges moves to point at information corresponding to the one gauge 1010'. The first needle 1012 moves to point at information corresponding to the other gauge 1020' of the merged gauges.

For example, the first gauge may be a speed gauge and the second gauge may be an RPM gauge.

Figure 11:
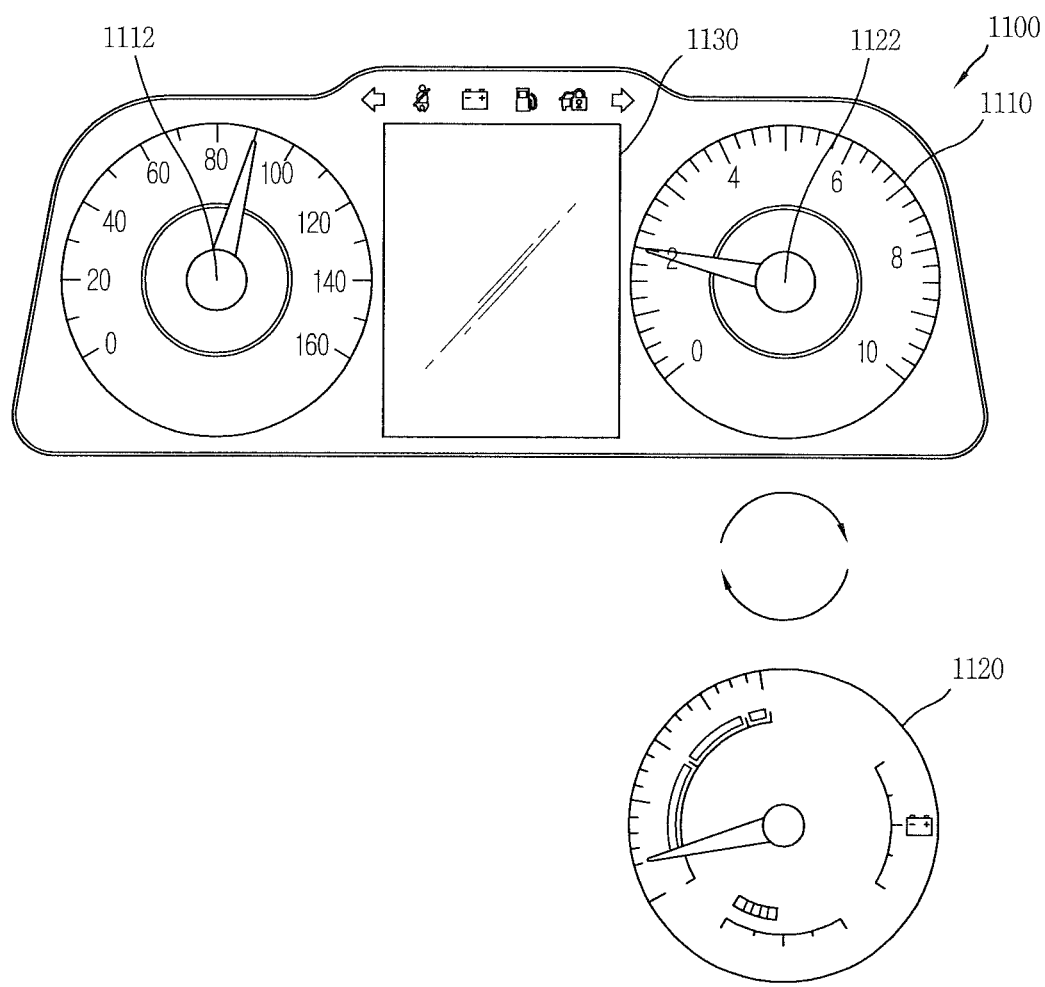
FIG. 11 is a front view illustrating an example replacement of one gauge with another gauge.

FIG. 11 is an exemplary view illustrating an implementation in which one gauge is replaced with another gauge on a dashboard display.

A dashboard display 1100 may replace a currently-displayed gauge with a new gauge which has not been output according to a generated event.

In more detail, needles may include first and second needles 1112 and 1122 pointing at different types of information on different positions, and the dashboard display 1100 may output a first gauge corresponding to the first needle 1112 and a second gauge corresponding to the second needle 1122. The dashboard display 1100 may control the display to replace one of the first and second gauges with a third gauge according to a preset condition. Also, the dashboard display 1100 may control one needle corresponding to the one gauge, of the first and second needles, to point at information to be provided using the third gauge.

For example, for a hybrid vehicle, an engine gauge 1110 may be output when using an engine, and a motor gauge 1120 other than the engine gauge 1110 may be output when using a motor. Since a displayed gauge is replaced according to a current state of the vehicle, the driver can accurately recognize the current state of the vehicle.

The dashboard display illustrated in one of FIGS. 5A to 11 may be replaced with the dashboard display illustrated in another of FIGS. 5A to 11.

Figure 12A:
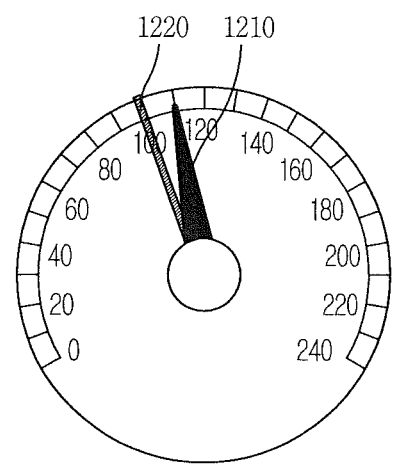
FIGS. 12A and 12B are close-up views illustrating an example displaying of new information to a driver using a virtual needle.
Figure 12B:
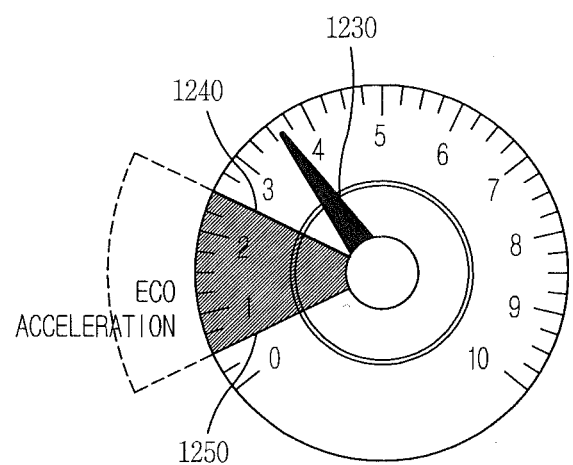

FIGS. 12A and 12B are exemplary views illustrating an implementation of guiding new information to a driver using a virtual needle.

The dashboard display may output a main needle pointing at first information of a gauge, and a sub needle pointing at second information, in view of outputting the gauge.

For example, as illustrated in FIG. 12A, for a speed gauge, a main needle 1210 may point at a current speed of the vehicle 100, and a sub needle 1220 may point at a speed limit of a currently-driving road of the vehicle 100. A speed pointed by the sub needle 1220 may differ according to the currently-driving road.

The sub needle may be a bar-like image that is formed long to point at one of scaled included in the gauge, and may be a different image according to a type of information pointed. Here, the different image refers to an image with a different shape, length, color or the like. For example, a first sub needle pointing at a speed limit may have a red color, and a second sub needle pointing at an economical speed (cruising speed) allowing for driving within a predetermined range of a fuel ratio may have a green color.

As another example, as illustrated in FIG. 12B, for an engine gauge, a main needle 1230 may point at a current RPM of the engine, and sub needles 1240 and 1250 may point at an RPM limit for maximizing fuel efficiency of the vehicle 100 on a currently-driving road. In this instance, the sub needles may include a first sub needle 1240 pointing at a maximum value of the RPM limit, and a second sub needle 1250 pointing at a minimum value of the RPM limit.

In some cases, the main needle may be configured as a physical needle which exists physically, and the sub needle may be configured as a virtual graphic object. Accordingly, the dashboard display according to the present application can provide various types of information using one gauge.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 170 of the vehicle. Therefore, it should also be understood that the above-described implementations are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

In addition, the present disclosure can be applied even to a vehicle having a dashboard display according to the one or more implementations.

What is claimed is:

1. A dashboard display of a vehicle, the dashboard display comprising:

a display panel having a speed display area that outputs a speed range of the vehicle at a first speed interval and an event display area that outputs an event information;

a needle that is configured to indicate a current speed of the vehicle by rotating to thereby point to a corresponding position along the displayed speed range; and a controller that is configured to, based on one or more preset conditions of the vehicle being satisfied, change a boundary of the speed display area from a first speed display area within the display panel to a second speed display area within the display panel that is different from the first speed display area, wherein:

the needle is a first needle, the dashboard display includes a second needle, the controller is configured to cause the display panel to display a first gauge that corresponds to the first needle and a second gauge that corresponds to the second needle, and the controller is configured to, based on the one or more preset conditions being satisfied, merge the first gauge and the second gauge to a single merged gauge that corresponds to one of the first and second needles, and indicate two different values on the merged gauge by using the corresponding one of the first and second needles and a virtual needle.

2. The dashboard display of claim 1, wherein the controller is configured to, based on the one or more preset conditions of the vehicle being satisfied, change the event display area from a first event display area within the display panel to a second event display area within the display panel that is different from the first event display area.

3. The dashboard display of claim 2, wherein one or more of display size, display position, or display shape of the first speed display area is different from the corresponding ones of the second speed display.

4. The dashboard display of claim 3, wherein the first speed display area outputs a first speed range of the vehicle, and wherein the second speed display area outputs a second speed range of the vehicle, the first speed range and the second speed range having a different maximum displayed speed range or a different speed interval or both.

5. The dashboard display of claim 3, wherein the controller is configured to, based on a rotation angle of the needle being within a first range, set the speed display area as the first speed display area and the event display area as the first event display area, and wherein the controller is configured to, based on the rotation angle of the needle being within a second range that is different from the first range, set the speed display area as the second speed display area and the event display as the second event display area.

6. The dashboard display of claim 3, wherein:

the display comprises the speed display area, the event display area, and a revolution per minute (RPM) display area that outputs an RPM range of an engine of the vehicle;

the dashboard display further comprises an RPM needle that is configured to indicate a current RPM of the vehicle's engine by rotating to thereby point to a corresponding position along the displayed RPM range; and the controller is configured to, based on the one or more preset conditions of the vehicle being satisfied, change a boundary of at least one of the speed display area, the event display area, or the RPM display area.

7. The dashboard display of claim 6, wherein the event display area is positioned horizontally between the speed display area and the RPM display area, and wherein the needle of the speed display area and the RPM needle of the RPM display area are configured (i) to point outward away from the event display area when in their respective home positions and (ii) to rotate inward toward the event display area to indicate the current speed and the current RPM, respectively.

8. The dashboard display of claim 1, wherein the one or more preset conditions include a rotation angle of the needle or a change in a size of the event display area or both.

9. The dashboard display of claim 1, wherein the controller is configured to cause the display panel to display, on the speed display area, the virtual needle that points to a speed limit of a road where the vehicle is currently located.

10. The dashboard display of claim 1, wherein the controller is configured to cause the display panel to display, on the speed display area, adjacent to a moving end of the needle, a numerical value of the current speed that moves along with the moving end of the needle.

11. A dashboard display of a vehicle, the dashboard display comprising:
a display panel having a speed display area that outputs a speed range of the vehicle at a first speed interval and an event display area that outputs an event information, the speed display area being configured to show a needle that indicates a current speed of the vehicle by rotating to thereby point to a corresponding position along the displayed speed range; and
a controller that is configured to:
based on one or more preset conditions of the vehicle being satisfied, change a boundary of the speed display area from a first speed display area within the display panel to a second speed display area within the display panel that is different from the first speed display area, and
receive event information generated by an event during operation of the vehicle,
wherein:
the needle is a first needle,
the dashboard display includes a second needle,
the controller is configured to cause the display panel to display a first gauge that corresponds to the first needle and a second gauge that corresponds to the second needle, and
the controller is configured to, based on the one or more preset conditions being satisfied, replace one of the first and second gauges with a third gauge, and indicate a desired value on the third gauge by rotating the corresponding one of the first and second needles.

12. The dashboard display of claim 11, wherein the controller is configured to, based on the one or more preset conditions of the vehicle being satisfied, change the event display area from a first event display area within the display panel to a second event display area within the display panel that is different from the first event display area.

13. The dashboard display of claim 12, wherein the changed boundary of the speed display area corresponds to the event, and wherein one or more of display size, display position, or display shape of the first speed display area is different from the corresponding ones of the second speed display.

14. The dashboard display of claim 13, wherein the event display area is reduced when the speed display area is increased, and the event display area is increased when the speed display area is reduced.

15. The dashboard display of claim 14, wherein the event information generation includes generation of a collision probability warning between the vehicle and an object located outside the vehicle, and wherein the speed display area and the event display area are progressively reduced and increased, respectively, based on an increase of the collision probability.

16. The dashboard display of claim 15, wherein the controller is configured to, based on the collision probability being above a threshold value, cause the display panel to display, on the event display area, a captured image of the object located outside the vehicle.

17. The dashboard display of claim 13, wherein the first speed display area outputs a first speed range of the vehicle, and wherein the second speed display area outputs a second speed range of the vehicle, the first speed range and the second speed range having a different maximum displayed speed range or a different speed interval or both.

18. The dashboard display of claim 11, wherein the controller is configured to, based on the one or more preset conditions of the vehicle being satisfied, change at least one of a minimum displayed speed range or a maximum displayed speed range according to one or both of a size of the speed display area and the current speed of the vehicle.

19. The dashboard display of claim 11, wherein the controller is configured to, based on the one or more preset conditions of the vehicle being satisfied, change the speed interval according to a size of the speed display area.

20. A dashboard display of a vehicle, the dashboard display comprising:
a display panel defining at least one hole, the display panel comprising a speed display area that outputs a speed range of the vehicle, and an event display area that outputs an event information;
a needle that is configured to indicate a current speed of the vehicle by rotating to thereby point to a corresponding position along the displayed speed range;
a driving portion that is configured to apply power for rotating the needle;
a fixing portion that connects the needle and the driving portion through the at least one hole; and
a controller that is configured to:
based on one or more preset conditions of the vehicle being satisfied, change a boundary of the speed display area from a first speed display area within the display panel to a second speed display area within the display panel that is different from the first speed display area, and
control the driving portion to apply power to rotate the needle to thereby indicate the current speed of the vehicle on the second display area.

* * * * *